United States Patent
Lary et al.

[15] 3,681,710
[45] Aug. 1, 1972

[54] GAS LASER

[72] Inventors: Edmund C. Lary; Russell G. Meyerand, Jr., both of Glastonbury, Conn.

[73] Assignee: United Aircraft Corporation, East Hartford, Conn.

[22] Filed: May 21, 1971

[21] Appl. No.: 145,964

Related U.S. Application Data

[63] Continuation of Ser. No. 797,308, Dec. 23, 1968.

[52] U.S. Cl. ..................331/94.5, 330/4.3, 315/111, 313/161, 313/231, 332/7.51
[51] Int. Cl. ...............................................H01s 3/00
[58] Field of Search ......330/4.3; 332/7.51; 331/94.5; 313/156, 161, 231; 315/111; 219/10.55, 10.65 VC, 10.51

[56] References Cited

UNITED STATES PATENTS

| | | | |
|---|---|---|---|
| 3,120,621 | 2/1964 | Günther et al. | 315/111 |
| 3,329,864 | 7/1967 | Michel et al. | 313/161 |
| 3,435,363 | 3/1969 | Parel | 331/94.5 |
| 3,445,616 | 5/1969 | Guyer | 219/10.65 |

OTHER PUBLICATIONS

Hurle et al.: " Electronic Population Inversions by Fluid–Mechanical Techniques," The Physics of Fluids, Vol. 8, No. 9, Sept. 1965 pp. 1601– 1606

Kovacs et al.: " A Switching of Molecular Gas Transitions" Applied Physics Letters Vol. 8, No. 3, 1966, p. 62

*Primary Examiner*—Ronald L. Wibert
*Assistant Examiner*—R. J. Webster

[57] ABSTRACT

A gas laser utilizes a magnetic field having components transverse to the flow of an energizing gas, such as nitrogen, to induce currents within the energizing gas which result in electron collisions with the molecules of the energizing gas to thereby preferentially excite the energizing gas to a vibrational level conductive to the transfer of energy through resonant collisions to a lasting gas. One embodiment comprises a gas laser with electric discharge excitation of a new variety having its own intrinsic power supply whereby excitation of the energizing gas is accomplished solely through collisions with electrons created through magnetogasdynamic (MGD) effects. In a second embodiment, the magnetogasdynamics may be provided in a gas dynamic laser of the type using a rapid cooling of an energizing gas having a high heat enthalpy so as to augment the population inversions created by the freezing of energy states as a result of rapid cooling of the energizing gas, or in a gas laser employing electric discharge excitation. In one form, the lasing gas, possibly together with a relaxation agent such as helium, is injected into a laser cavity through which the preferentially excited energizing gas flows. In another form, the magnetogasdynamics are employed at the laser cavity.

4 Claims, 9 Drawing Figures

INVENTORS
RUSSELL G. MEYERAND, JR.
EDMUND C. LARY
BY Melvin Pearson Williams
ATTORNEY

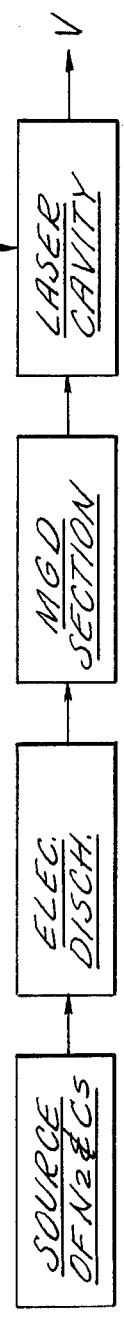
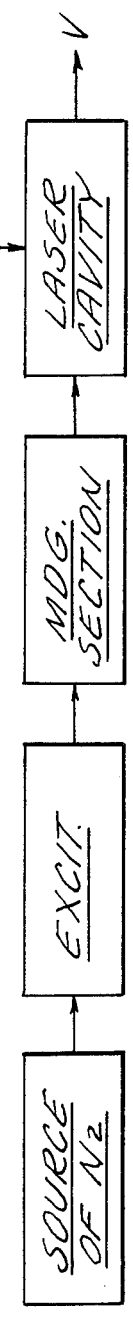
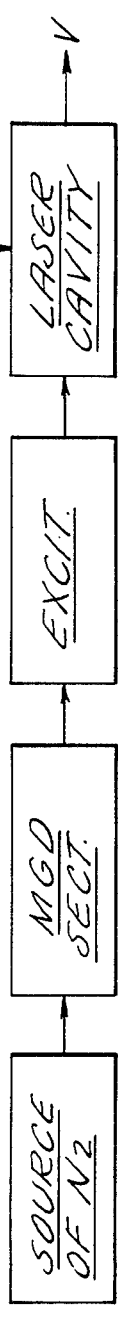
FIG. 6
FIG. 7
FIG. 8
FIG. 9

GAS LASER

This application is a continuation of Ser. No. 797,308, filed Dec. 23, 1968.

BACKGROUND OF THE INVENTION

1. Field of Invention

This invention relates to gas lasers, and more particularly to the utilization of magnetogasdynamics (MGD) for the preferential excitation of an energizing gas therein.

2. Description of the Prior Art

A well-known type of gas laser which has received considerable attention recently is the electric discharge laser. Therein, an energizing gas such as nitrogen is preferentially raised to the first vibrational level ($V=1$) of energy through collision with electrons accelerated in a plasma under the influence of a substantial electric field. The electronic collisions with molecules of nitrogen have been found preferentially to excite the first vibrational level, thus providing the necessary population in a level which readily transfers energy to a lasing gas, such as carbon dioxide, through resonant collisions between the molecules of the two gases, leaving the lasing gas in an upper laser level of excitation (such as the 001 level of carbon dioxide). With the population inversion at this level, the lasing gas emits photons, to a small degree spontaneously, and very rapidly when stimulated by light of the same wavelength, as occurs within a properly resonated optical cavity. In such a system, the energy input to the system is primarily supplied by the electrical power input to the electric discharge, which energy is converted into electron energy and then into the total enthalpy of the energizing gas molecules, there being a substantial percentage of the molecules energized to the first vibrational level. In addition, energy is supplied to the system through the kinetics of the gaseous flow of the energizing gas. Thus, the nitrogen must be pulled through the laser system by means of suitably adjusted pressure differentials.

Another well-known form of gas laser is the gas dynamic laser which supplies energy to the energizing gas in the form of heat, and then freezes this energy, to a substantial degree, in vibrational energy by means of rapidly cooling the hot energizing gas. For instance, heating of nitrogen and then passing it through an expansion nozzle can freeze the energy states such that a large proportion of the nitrogen molecules are in the $V=1$ state. As in the case of the electric discharge gas laser, collisions between the nitrogen molecules in the $V=1$ state and the carbon dioxide molecules transfers the energy through resonant collisions to the carbon dioxide molecules in the upper laser level (001) of energy. This results in a population inversion because of the selective, or preferential, energy transfer to the upper laser level. With a suitable population inversion, the lasing gas will emit photons which, if within an optical cavity, result in laser action.

The problems of lasers of the type described include the need for bulky and complex power supplies for the operation of gas dischargers; or the provision of fuel and a suitable combustion environment so as to convert fuel to heat energy within nitrogen, in combination with rapid cooling means such as a nozzle. Naturally, the nozzle will be effective only if suitable pumps are available to create the necessary flows, which result in cumbersome, complex and expensive equipment in either case.

SUMMARY OF INVENTION

The object of the present invention is to provide an improved gas laser.

According to the present invention, a non-equilibrium magnetogasdynamic generator comprising a flow of molecular gas results in a transverse flow of electrons having elevated static temperatures which in turn preferentially excite the molecular gas to vibrational levels of energy suitable for lasing or transfer of energy to a laser level of a lasing gas through resonant collisions. The invention comprises a magnetic field having flux components transverse to the flow of gas at a point in a flowing gas laser system which is upstream of or at the optical cavity thereof.

In accordance with the invention in one form, magnetic fields are created orthogonally with respect to the flow of the laser energizing gas, with elements of the field at incremental spacial positions being oriented with mutually opposite sense so as to create short circuit currents within the flow of energizing gas. In accordance with the invention in another form, the energizing gas may flow axially through one or more toroidal magnetic fields so as to create a flow of electrons of elevated temperature in an annular fashion through the flow of energizing gas.

In one embodiment of the invention, the energization for the gas laser may be provided solely through the magnetogasdynamic (MGD) effects of the magnetic field interacting with the flow of molecular gas. In other embodiments of the invention, the energization of the molecular gas may result from the combined effects of MGD action together with gas dynamic freezing of energy states of a flow of high enthalpy molecular gas, or with the preferential excitation of molecular gas a result of an electric discharge or plasma.

In further accord with the present invention, the electrical conductivity of the molecular gas may be enhanced by seeding with a suitable substance; for instance, the conductivity of nitrogen may be suitably enhanced by the seeding of a small percentage of cesium gas.

The present invention provides a capability of a relatively simple, more nearly self-contained gas laser, by means of utilization of MGD principles to create electron collisions within the flow of molecular gas.

The foregoing and other objects, features and advantages of the present invention will become more apparent in the light of the following detailed description of preferred embodiments thereof, as illustrated in the accompanying drawing.

BRIEF DESCRIPTION OF THE DRAWING

FIG. 6 is a schematic block diagram of a gas laser system employing the present invention and having gas dynamic excitation located upstream of the MGD section;

FIG. 7 is a schematic block diagram of a gas laser system employing the present invention and having electric discharge excitation located upstream of the MGD section;

FIG. 8 is a schematic block diagram of a gas laser system employing the present invention and having some form of excitation located upstream thereof; and FIG. 9 is a schematic block diagram of a gas laser system employing the present invention and having downstream additional excitation.

DESCRIPTION OF THE PREFERRED EMBODIMENT

Figure 1:
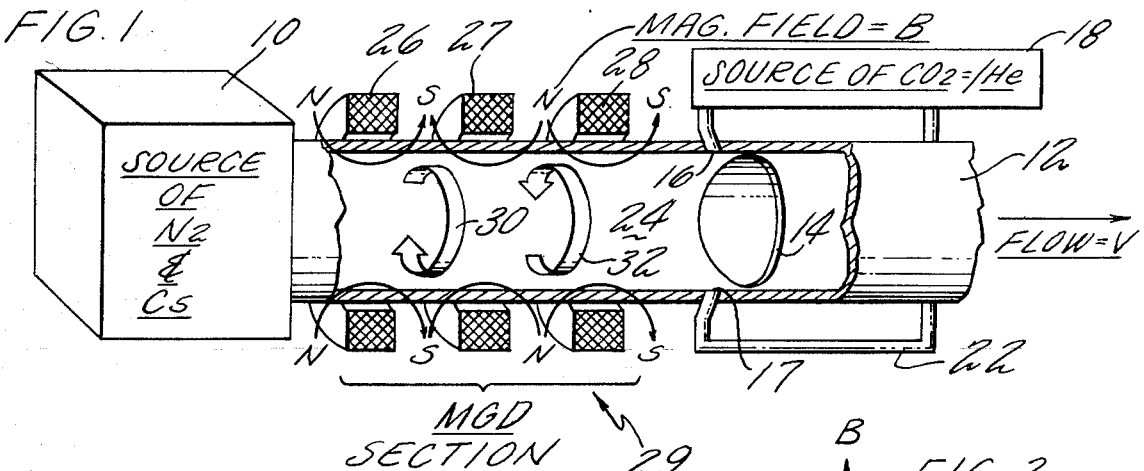
FIG. 1 is a partially sectioned, simplified, schematicized perspective view of an axisymetric embodiment of the present invention.

Referring now to FIG. 1, an embodiment of the present invention in a simple form comprises a source of energizing gas such as a source 10 of a mixture of nitrogen and cesium. This source 10 is at some pressure with respect to the outflow (or effluent) of the laser so as to cause a flow of seeded energizing gas to proceed through the system, such as from left to right as seen in FIG. 1. The laser comprises a tube 12 which may be made of any suitable material or combination of materials, and may preferably comprise an insulating refractory tube of a type well known in the MGD art. A laser cavity including a mirror 14 is disposed with its axis transverse with respect to the axis of the tube 12. Inlets 16, 17 may be provided so as to permit a lasing gas, such as a mixture of carbon dioxide and helium, to flow from a source 18 through suitable conduits 20, 22 into a chamber 24 formed by the tube 12. Although depicted schematically in FIG. 1, a flow-type laser having a laser cavity transverse to the flow with injection of the lasing gas substantially at or just upstream of the cavity may take a variety of forms in apparatus employing the present invention. For instance, suitable structure is disclosed in the copending applications of Bronfin et al, Ser. No. 710,699; Pinsley et al, Ser. No. 710,696; and Brown et al, Ser. No. 710,698; all of which were filed on Feb. 23, 1968, and assigned to the same assignee as the present invention.

Figure 2:
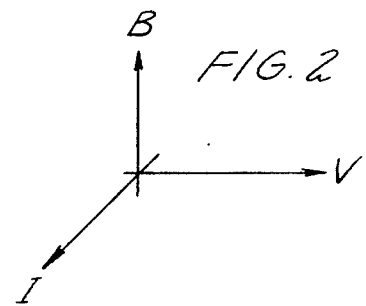
FIG. 2 is a vector diagram of MGD action.

Disposed about the laser tube 12 are one or more sources of magnetomotive force, such as a plurality of toroidal magnets 26–28, which together comprise an MGD section 29. The magnets may preferably be arranged with alternative magnetic sense, as indicated by the letters "N" and "S". The magnetic field within the tube 12 due to magnet 26 will be from left to right; that due to magnet 27 will be from right to left, and that due to magnet 28 will be from left to right. In accordance with the well-known magnetomotive relationship illustrated in FIG. 2, the movement (V) of the energizing gas (such as nitrogen) from left to right in FIG. 1 through the magnetic fields (B) created by the magnets 26–28 will result in currents (I) illustrated by the arrows 30 and 32. Only the components of flux transverse to the flow will result in current. The current will be annular in nature, and that current which flows between the magnets 26 and 27 will be clockwise as viewed from the source 10, and the current resulting from magnets 27 and 28 will be counterclockwise as viewed from the source 10. Of course, additional current flow of alternating polarities will exist to the left of magnet 26 and to the right of magnet 28. As a result of the current flow within the MGD section, the enthalpy of the electrons in the nitrogen flow is increased proportionally with the square of the current density, and inversely proportionally to the conductance of the medium. This creates "hot" electrons, which collide with the nitrogen ions and molecules, and in a fashion which is similar to the well-known electric discharge method of exciting nitrogen gas, preferentially excite the molecules to the first vibrational energy level. Thus magnetogasdynamic effect on the nitrogen is quite similar to the effect of an electric discharge excitation; in fact, the invention herein does provide an internal electric excitation of the nitrogen gas.

The nitrogen which is excited as it passes along the chamber 24 within the magnets 26–28 collides with a lasing gas, such as carbon dioxide, as the nitrogen enters the region of flow where the lasing gas is introduced, such as near the ports 16, 17. As a result of collisions, the energy in the first vibrational level of the nitrogen molecules is transferred to the carbon dioxide molecules resulting in an inverted population of molecules in the 001 or upper laser level of $CO_2$ molecules. This, in turn, supports the stimulated emission of photons resulting in a laser output, as is known in the art.

Figure 3:
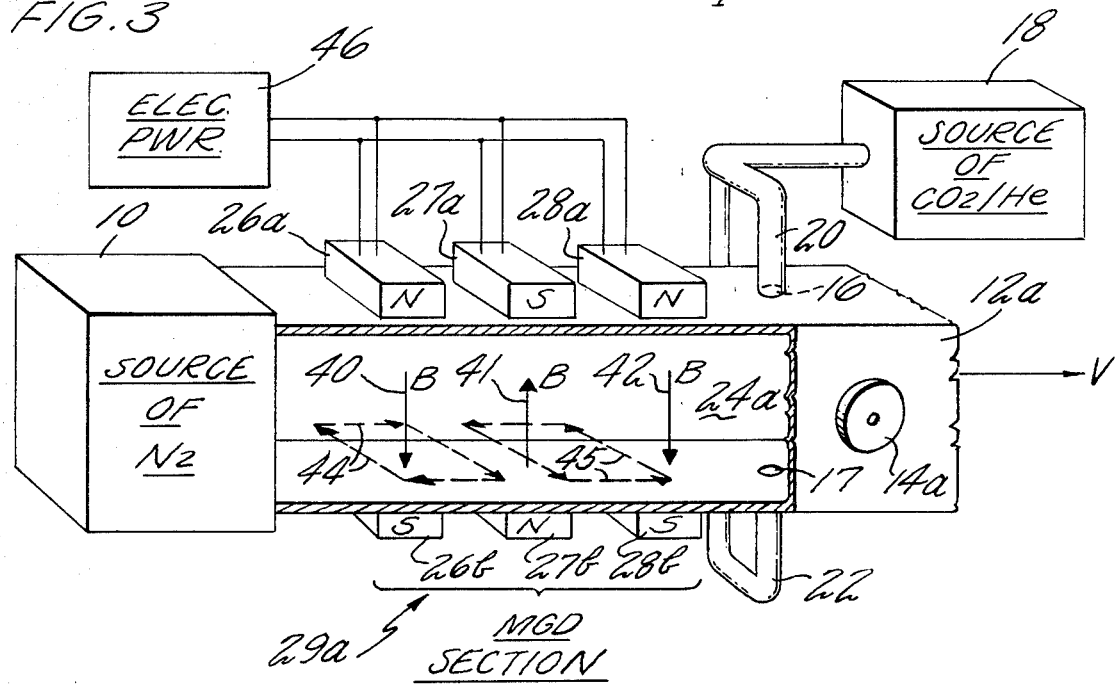
FIG. 3 is a partially sectioned, simplified, schematicized view of an orthogonal embodiment of the present invention.

Referring now to the embodiment of FIG. 3, a nonaxisymetric embodiment may, if desired, be implemented in other than a generally circular configuration, as illustrated by the rectangular laser tube 12a. However, the cross-sectional shape of the tube 12a is not significant in terms of operation of the embodiment of FIG. 3. Instead, the major difference is the utilization of pairs of magnets 26a, 26b; 27a, 27b; 28a, 28b to form an MGD section 29a. By utilizing pairs of magnets, linear magnetic fields may be provided. By having fields of opposite sense, as illustrated by arrows 40–42 in FIG. 3, current loops may be formed so that a totally internal flow of current can be established (in a fashion similar to that established in FIG. 1). The currents within the flow of nitrogen are illustrated in FIG. 3 as dotted closed loops. In the embodiment of FIG. 3, little or no current would flow other than in the two rings of current 44, 45 directly between the magnets. The laser operation of the embodiment of FIG. 3 is identical to that of the embodiment of FIG. 1.

As shown in FIG. 3, the magnets may be electromagnets powered by a suitable source of electric current, as illustrated by the electric power source 46 with respect to magnets 26a, 27a, and 28a. On the other hand, the magnets in accordance with the present invention may be so-called permanent magnets or superconducting coils of a suitable material as is known in the art.

Figure 4:
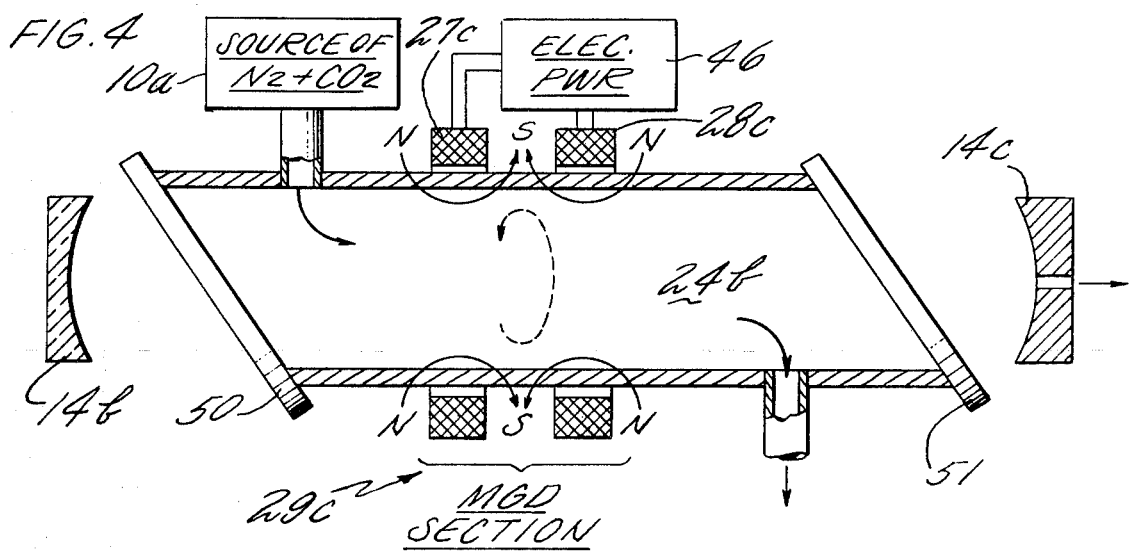
FIG. 4 is a partially sectioned, simplified, schematicized view of an axial and non-mixing embodiment of the present invention.

In the embodiment of FIG. 4, the nitrogen and $CO_2$ are premixed, and the flow of gas is axial with respect to the optical cavity. Thus, the chamber 24b is closed off by a pair of Brewster windows 50, 51 and the mirrors 14b, 14c are provided externally of the chamber. Alternatively, the chamber may be closed off with a pair of mirrors, one of which is suitably designed to provide output coupling. This is in accordance with well-known teachings in the gas laser art. In this embodiment, the MGD section 29c may comprise toroidal magnets 27c and 28c of the type illustrated in FIG. 1, but these may either be permanent magnets or electromagnets operated by an electric power supply 46 of the type illustrated in FIG. 2. In this embodiment, the source of $N_2$ also comprises a source of $CO_2$, the source 10a providing a combination or mixture of $N_2$ and $CO_2$ into the chamber 24b, the excitation taking place as a result of the magnetogasdynamic effects described hereinbefore, within the chamber 24b. Thus the excitation of the nitrogen and therefore the $CO_2$ occurs within the optical cavity (formed by the pair of mirrors 14b, 14c).

Figure 5:
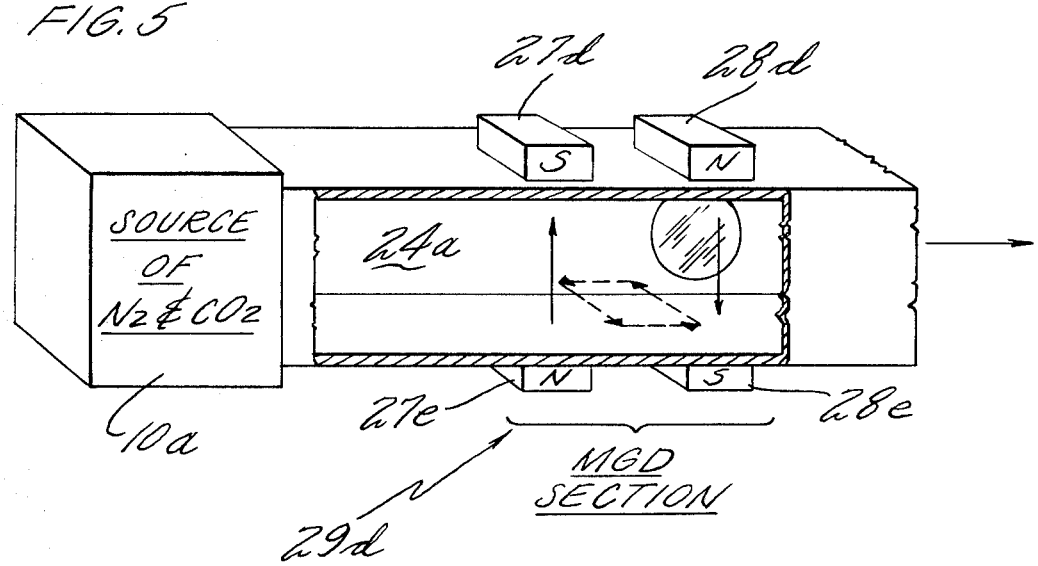
FIG. 5 is a partially sectioned, simplified, schematicized view of a non-mixing, transverse flow embodiment of the present invention.

The embodiment of FIG. 5 is a non-mixing embodiment as is the embodiment of FIG. 4. In FIG. 5, the magnets 27d, 27e; 28d, 28e are disposed in rectangular configuration, similar to that of FIG. 2, but these may comprise permanent magnets if desired. These magnets are located at a point with respect to the optical cavity so that the excitation of the nitrogen takes place as it approaches the optical cavity, and the nitrogen in turn excites the $CO_2$ at approximately the upstream perimeter of the optical cavity so that the $CO_2$ will lase within the optical cavity but not prelase before reaching the optical cavity.

The embodiments of FIGS. 4 and 5 operate in the same fashion as described with respect to FIG. 1 hereinbefore, insofar as the magnetogasdynamic effect is concerned. These embodiments, however, avoid the necessity of mixing $CO_2$ into the flow of energized nitrogen as is true in the case of the embodiments of FIGS. 1 and 3.

The important feature with respect to FIGS. 1 and 3–5 is that magnetogasdynamic excitation of an energizing gas in a gas laser can be accomplished in any configuration of flowing gas laser system.

In embodiments of FIGS. 1, and 3–5, the excitation of the nitrogen is in response to the pressure of nitrogen, which causes the flow thereof, and to the magnetic fields; this results in electric excitation of the nitrogen to the first vibrational level, preferentially. There is no external nitrogen energization in the embodiments of FIGS. 1 and 3–5. Referring now to FIG. 6, it is possible to utilize heated nitrogen and carbon dioxide passed through a rapid expansion nozzle for the purpose of freezing energy levels, thus to achieve a large number of nitrogen molecules in the first vibrational state; this could then be followed by a magnetogasdynamic section of the type illustrated in FIGS. 1 and 3 so as to augment the energization provided by the combination of heat and rapid cooling. The heat and rapid cooling could be the type illustrated in the copending Bronfin et al application identified hereinbefore.

It is also possible to use the present invention as an augmentation for an electric discharge excited gas laser as illustrated in FIG. 7. Thus, a large number of nitrogen molecules may be raised to the first vibrational state by collisions with electrons in the plasma of an electric discharge, following which additional nitrogen atoms would be raised to the first vibrational state as a result of MGD-induced currents in accordance with the present invention.

The embodiments of FIGS. 6 and 7 may be generalized, in a mixing configuration, as shown in FIG. 8 wherein some sort of excitation may be utilized upstream of the MGD section of a gas laser in accordance with the present invention, whereby the MGD section augments the excitation already provided by the excitation means of the prior art, upstream thereof. In a similar fashion, the present invention may be utilized to augment a gas laser of the prior art by providing the MGD section upstream of the prior art excitation as illustrated generically in FIG. 9. The particular arrangement of the present invention with or without additional excitation in a mixing or non-mixing configuration, may be selected as desired in order to suit the implementation of any given utilization of the present invention.

The energy which is converted into electron enthalpy in the present invention is primarily derived from the kinetic energy of the flowing energizing gas, such as nitrogen. The velocity of the nitrogen, interacting with the magnetic field, causes the electron flow which results in electron collisions with molecules, thereby preferentially exciting these molecules to the first vibrational state, in a fashion similar to an external electric discharge excitation means. Thus the general enthalpy of the flowing molecules is converted, preferentially, to energy in the first vibrational state as a result of magnetogasdynamic action. The heat energy resulting from the current flow is, to a substantial degree, converted to energy of the nitrogen molecules in the first vibrational level. The advantage of the invention is thus the preferential excitation of energizing gas molecules to a vibrational level at which it can readily transfer its energy to a lasing level of a lasing gas. In other words, the present invention works on the principle of an elevated electron temperature, or may be considered to be a non-equilibrium conductivity MGD generator with complete internal dissipation of the power generated (in which there are no electric losses outside of the flowing gas).

Although the invention has been shown and described with respect to preferred embodiments thereof, it should be understood by those skilled in the art that the foregoing and various other changes and omissions in the form and detail thereof may be made therein, without departing from the spirit and the scope of the invention.

Having thus described typical embodiments of our invention, that which we claim as new and desire to secure by Letters Patent of the United States is:

1. In a gas laser of the type including:
  a source of gas including a molecular gas;
  a chamber; and
  fluid conduit means interconnecting said source and said chamber; the improvement comprising:
  means causing the flow of said gas along said conduit means and through said chamber at a preselected flow rate; and
  excitation means for imparting energy into said molecular gas in a manner to preferentially excite molecules of said flowing gas to a vibrational energy state, said excitation means consisting solely of means for producing a magnetic field in said chamber having substantial components normal to said flow.

2. The improvement according to claim 1 wherein said magnetic field producing means comprises a plurality of annular magnets for establishing toroidal fields thereabout, adjacent ones of said magnets establishing fields of opposite sense.

3. The improvement according to claim 1 wherein said magnetic field producing means includes means for establishing at least two magnetic fields of opposite sense transversely with respect to the flow of energizing gas through said fluid conduit means.

4. The improvement according to claim 1 further comprising: auxiliary means independent of said flow means and said last named means for imparting additional energy into said flowing gas at a point separate from said chamber.

* * * * *